United States Patent
Sadano et al.

(10) Patent No.: US 9,533,588 B2
(45) Date of Patent: Jan. 3, 2017

(54) ELECTRIC VEHICLE HAVING COVER FOR INLET FOR DC CHARGING AND LOCK MECHANISM TO LOCK COVER

(71) Applicant: HONDA MOTOR CO., LTD., Tokyo (JP)

(72) Inventors: Hakaru Sadano, Wako (JP); Hiroyuki Kanazawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 14/537,906

(22) Filed: Nov. 11, 2014

(65) Prior Publication Data
US 2015/0137755 A1  May 21, 2015

(30) Foreign Application Priority Data
Nov. 19, 2013 (JP) .................................. 2013-238532

(51) Int. Cl.
*B60L 11/18* (2006.01)

(52) U.S. Cl.
CPC ......... *B60L 11/1818* (2013.01); *Y02T 10/7005* (2013.01)

(58) Field of Classification Search
CPC ........................ B60L 11/1818; Y02T 10/7005
See application file for complete search history.

(56) References Cited

U.S. PATENT DOCUMENTS

| 8,028,780 | B2 * | 10/2011 | Sagawa | B60K 15/05 180/65.27 |
|---|---|---|---|---|
| 8,084,882 | B2 * | 12/2011 | Soma | B60K 6/28 307/9.1 |
| 8,531,284 | B2 * | 9/2013 | Liu | B60L 3/0069 320/107 |
| 8,541,978 | B2 * | 9/2013 | Fukuo | B60L 3/0069 320/109 |
| 8,896,266 | B2 * | 11/2014 | Ohtomo | B60L 3/0069 320/104 |
| 9,187,002 | B2 * | 11/2015 | Kagawa | B60L 3/04 |
| 9,199,538 | B2 * | 12/2015 | Masuda | B60L 3/0069 |
| 9,263,907 | B2 * | 2/2016 | Richardson | H02J 7/007 |
| 9,283,852 | B2 * | 3/2016 | Jefferies | B60L 3/0069 |
| 2011/0121780 | A1 * | 5/2011 | Fukuo | B60L 3/0069 320/109 |

(Continued)

FOREIGN PATENT DOCUMENTS

JP       2010-110068       5/2010

*Primary Examiner* — Naum B Levin
(74) *Attorney, Agent, or Firm* — Mori & Ward, LLP

(57) ABSTRACT

An electric vehicle includes a battery, a charging lid, a vehicle-side charging connector, a contactor, a contactor welding detector, a DC inlet cover, a DC lock mechanism, and a lock controller. The battery is to be charged with power supplied from an external power supply. The vehicle-side charging connector is disposed inside a position of the charging lid in the electric vehicle and includes an AC inlet for AC charging and a DC inlet for DC charging. The contactor is provided on a power line connecting the DC inlet to the battery. The contactor welding detector is configured to detect welding of the contactor. The DC inlet cover covers the DC inlet without covering the AC inlet in a state where the DC inlet cover is in a closed state. The DC lock mechanism locks the DC inlet cover in the closed state.

10 Claims, 4 Drawing Sheets

(56) References Cited

U.S. PATENT DOCUMENTS

| | | | | |
|---|---|---|---|---|
| 2012/0206100 A1* | 8/2012 | Brown | ................ | B60L 3/0069 |
| | | | | 320/109 |
| 2012/0319648 A1* | 12/2012 | Ohtomo | ............... | B60L 3/0069 |
| | | | | 320/109 |
| 2013/0020993 A1* | 1/2013 | Taddeo | ................ | H02J 7/0027 |
| | | | | 320/109 |
| 2013/0088200 A1* | 4/2013 | Kamishima | .............. | B60L 3/04 |
| | | | | 320/109 |
| 2014/0022053 A1* | 1/2014 | Inoue | ............... | G07C 9/00174 |
| | | | | 340/5.61 |
| 2014/0197792 A1* | 7/2014 | Weber | ............... | B60L 11/1818 |
| | | | | 320/109 |
| 2014/0197793 A1* | 7/2014 | Herzog | .............. | B60L 11/1818 |
| | | | | 320/109 |
| 2015/0123600 A1* | 5/2015 | Groat | ................ | H02M 1/4258 |
| | | | | 320/107 |
| 2015/0303737 A1* | 10/2015 | Steinbuchel, IV | .... | B60L 3/0069 |
| | | | | 320/109 |
| 2016/0039298 A1* | 2/2016 | Herzog | .............. | B60L 11/1818 |
| | | | | 320/109 |

\* cited by examiner

ELECTRIC VEHICLE HAVING COVER FOR INLET FOR DC CHARGING AND LOCK MECHANISM TO LOCK COVER

CROSS-REFERENCE TO RELATED APPLICATIONS

The present application claims priority under 35 U.S.C. §119 to Japanese Patent Application No. 2013-238532, filed Nov. 19, 2013, entitled "Electric Vehicle." The contents of this application are incorporated herein by reference in their entirety.

BACKGROUND

1. Field

The present disclosure relates to an electric vehicle.

2. Description of the Related Art

In Japanese Unexamined Patent Application Publication No. 2010-110068, until a state in which it is determined that an anomaly occurs on an extension signal line (L2) ends, a charging lid lock mechanism (2701) is driven so that opening of a charging lid (230) provided for a charging inlet (270) of a vehicle is prevented (Claim 8, [0165], and FIG. 4). Examples of the anomaly include a break or a short circuit of the extension signal line (L2) ([0166]). The charging inlet (270) is one for alternating current ([0057]).

As standards for charging of an electric vehicle, the CHAdeMO standard and the combined charging system standard are known. In the combined charging system standard among these, both of normal charging with an alternating-current (AC) power supply and quick charging with a direct-current (DC) power supply are performed by using one charging connector.

SUMMARY

According to one aspect of the present invention, an electric vehicle having a battery charged with power supplied from an external power supply includes a charging lid, a vehicle-side charging connector, a contactor, a contactor welding detection unit, a DC inlet cover, a DC lock mechanism, and a lock controller. The vehicle-side charging connector is disposed at a position inner than a position of the charging lid in the electric vehicle. The vehicle-side charging connector is a connector in which both of an AC inlet for AC charging and a DC inlet for DC charging are integrally formed. The contactor is provided on a power line connecting the DC inlet to the battery. The contactor welding detection unit detects welding of the contactor. The DC inlet cover covers the DC inlet and does not cover the AC inlet when the DC inlet cover is in a closed state. The DC lock mechanism locks the DC inlet cover in the closed state. The lock controller causes the DC lock mechanism to lock the DC inlet cover when the welding of the contactor is detected.

According to another aspect of the present invention, an electric vehicle includes a battery, a charging lid, a vehicle-side charging connector, a contactor, a contactor welding detector, a DC inlet cover, a DC lock mechanism, and a lock controller. The battery is to be charged with power supplied from an external power supply. The vehicle-side charging connector is disposed inside a position of the charging lid in the electric vehicle and includes an AC inlet for AC charging and a DC inlet for DC, charging. The contactor is provided on a power line connecting the DC inlet to the battery. The contactor welding detector is configured to detect welding of the contactor. The DC inlet cover covers the DC inlet without covering the AC inlet in a state where the DC inlet cover is in a closed state. The DC lock mechanism locks the DC inlet cover in the closed state. The lock controller is configured to control the DC lock mechanism to lock the DC inlet cover when the contactor welding detector detects welding of the contactor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
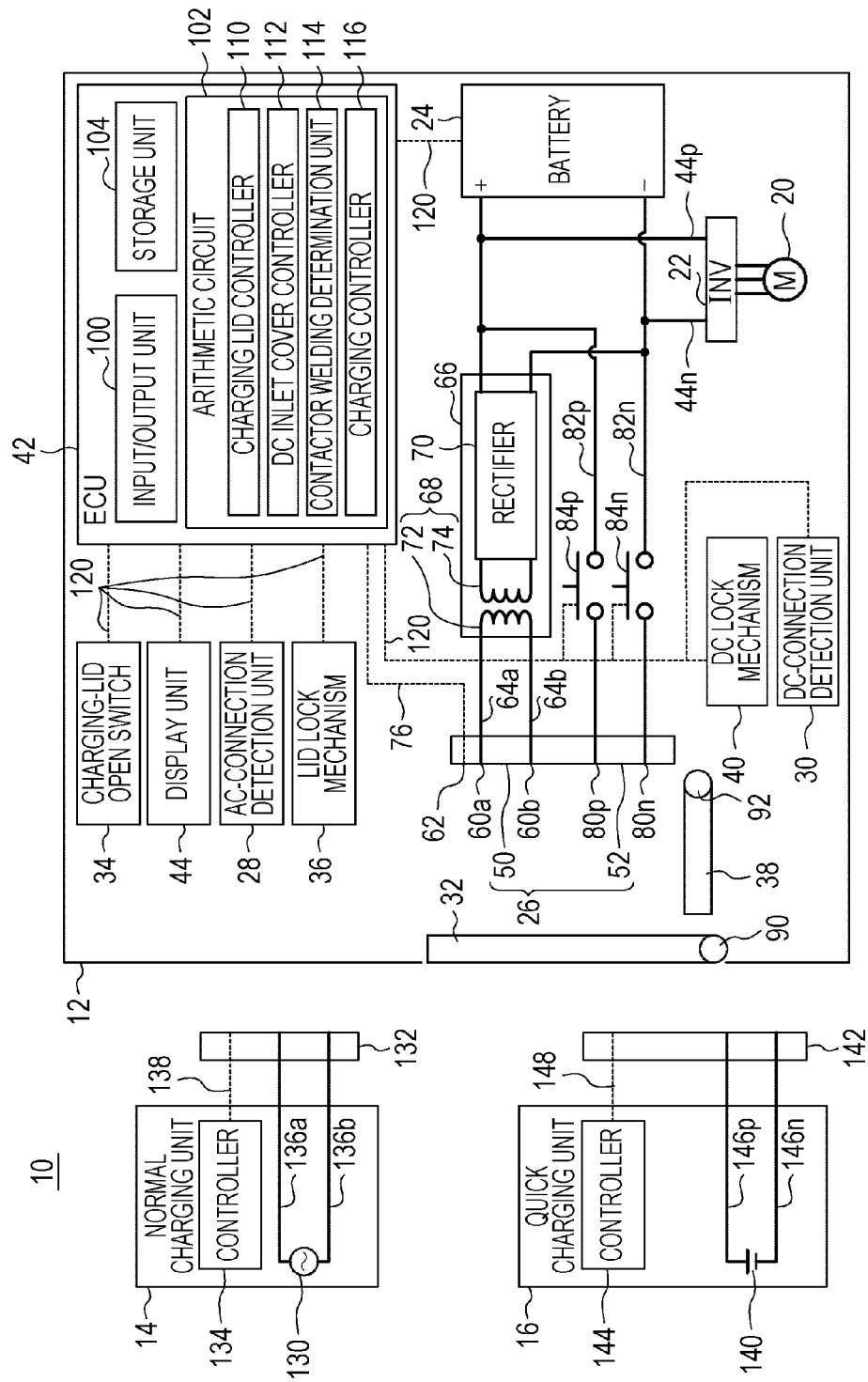
FIG. 1 is a schematic diagram illustrating the configuration of a charging system including an electric vehicle according to an embodiment of the present disclosure.

The embodiments will now be described with reference to the accompanying drawings, wherein like reference numerals designate corresponding or identical elements throughout the various drawings.

A. One Embodiment

1. Configuration

[1-1. Overall Configuration]

FIG. 1 is a schematic diagram illustrating the configuration of a charging system 10 including an electric vehicle 12 (hereinafter also referred to as a "vehicle 12") according to an embodiment of the present disclosure. The charging system 10 includes a normal charging unit 14 (hereinafter also referred to as a "charging unit 14") and a quick charging unit 16 (hereinafter also referred to as a "charging unit 16") as well as the vehicle 12.

[1-2. Vehicle 12]

(1-2-1. Overall Configuration of Vehicle 12)

The vehicle 12 includes a drive motor 20 (hereinafter also referred to as a "motor 20"), an inverter 22, a driving battery 24 (hereinafter also referred to as a "battery 24"), a vehicle-side connector 26 (vehicle-side charging connector), an AC-connection detection unit 28, a DC-connection detection unit 30, a charging lid 32, a charging-lid open switch 34, a lid lock mechanism 36, a DC inlet cover 38, a DC lock mechanism 40, an electronic control unit 42 (hereinafter referred to as an "ECU 42"), and a display unit 44.

(1-2-2. Motor 20)

The motor 20 which is a three-phase alternating-current brushless motor generates driving force F [N] (or torque [N·m]) of the vehicle 12 on the basis of power supplied from the battery 24 via the inverter 22. The motor 20, for example, charges the battery 24 by outputting power (regenerative power Preg) [W] generated through regeneration, to the battery 24, and also to a step-down converter, a low-voltage battery, and auxiliary machinery (not illustrated).

(1-2-3. Inverter 22)

The inverter 22 having the configuration of a three-phase full bridge inverter converts direct current supplied from the battery 24 via main power lines 44p and 44n of the anode side and the cathode side, into alternating current, and supplies the resulting current to the motor 20. The inverter 22 also supplies direct current just after AC/DC conversion which is generated through the regeneration operation, to the battery 24 (and the step-down converter, and the low-voltage battery and the auxiliary machinery).

(1-2-4. Battery 24)

The battery 24 is a storage battery (energy storage) including multiple battery cells, and, for example, a lithium-ion rechargeable battery, a nickel-metal hydride battery, or a capacitor may be used. In the present embodiment, a lithium-ion rechargeable battery is used. A DC/DC converter (not illustrated) may be provided between the inverter 22 and the battery 24, and the output voltage of the battery 24 or that of the motor 20 may be increased or decreased.

(1-2-5. Vehicle-Side Connector 26)

Figure 2:
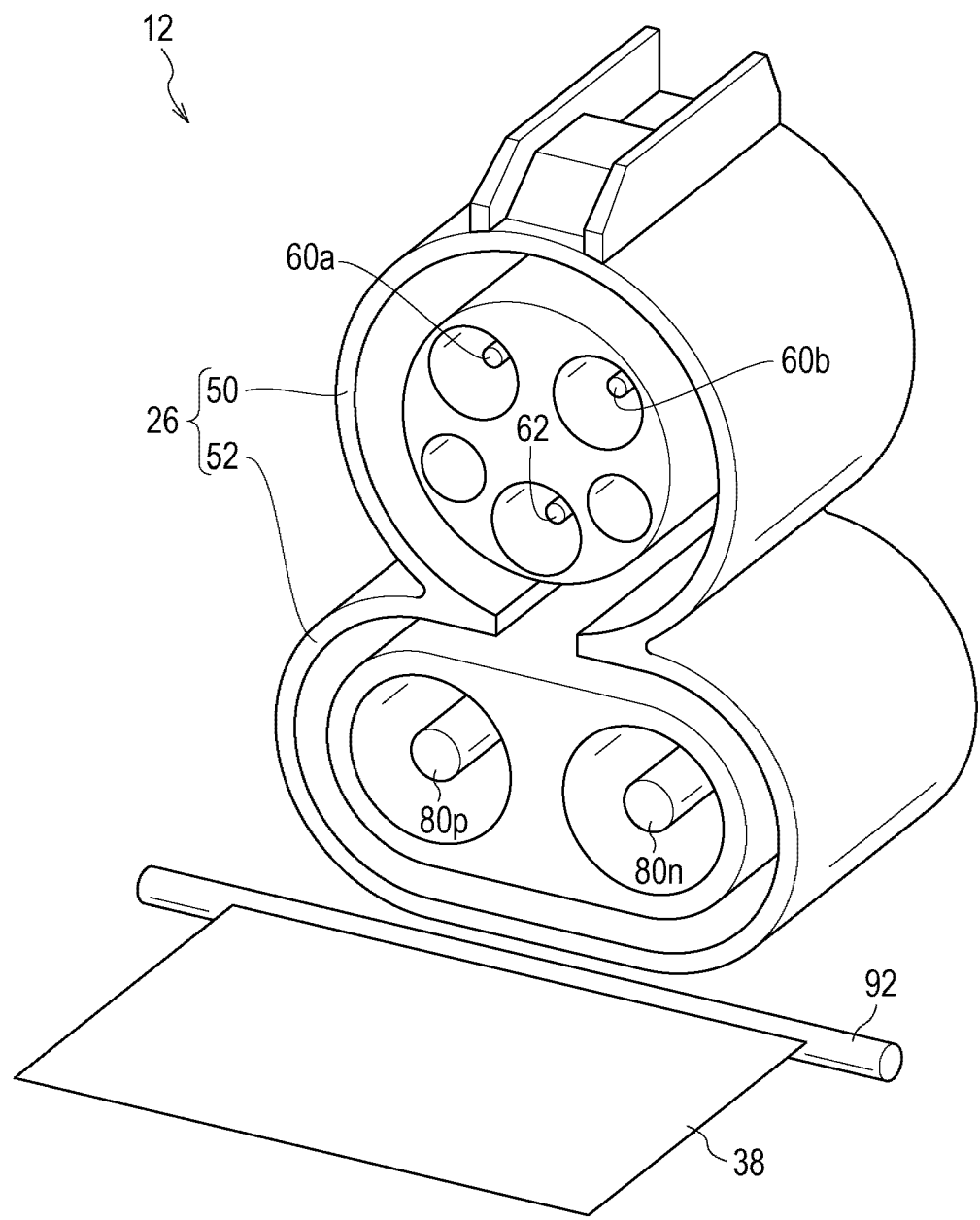
FIG. 2 is a diagram illustrating a state in which a DC inlet cover is open (in other words, a state in which the DC inlet cover does not cover a vehicle-side connector).
Figure 3:
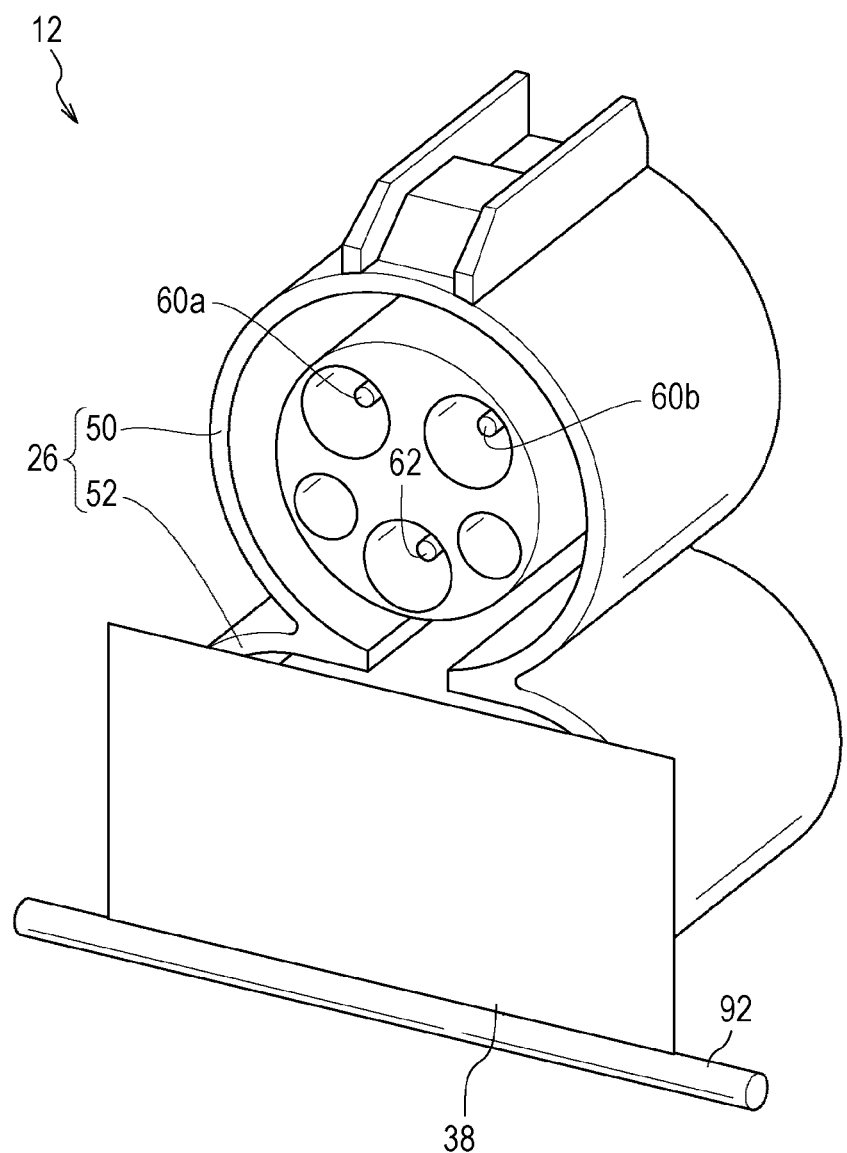
FIG. 3 is a diagram illustrating a state in which the DC inlet cover is closed (in other words, a state in which the DC inlet cover covers a portion of the vehicle-side connector).

FIG. 2 is a diagram illustrating a state in which the DC inlet cover 38 is open, in other words, a state in which the DC inlet cover 38 does not cover the vehicle-side connector 26 (hereinafter also referred to as the "connector 26"). FIG. 3 is a diagram illustrating a state in which the DC inlet cover 38 is closed, in other words, a state in which the DC inlet cover 38 covers a portion of the connector 26.

As illustrated in FIG. 2 and the like, the connector 26 has an AC inlet 50 for AC charging and a DC inlet 52 for DC charging which are integrally formed. The AC inlet 50 has power-line connection units 60a and 60b for AC charging and a communication-line connection unit 62 for communicating with the normal charging unit 14 or the quick charging unit 16.

As illustrated in FIG. 1, the power-line connection units 60a and 60b are connected to power lines 64a and 64b (hereinafter referred to as "AC charging lines 64a and 64b") connecting the AC inlet 50 to the battery 24. On the power lines 64a and 64b, a charger 66 having a transformer 68 and a rectifier 70 is provided. In the transformer 68, a primary coil 72 on the AC inlet 50 side faces a secondary coil 74 on the battery 24 side. The communication-line connection unit 62 is connected to a communication line 76 connecting the AC inlet 50 to the ECU 42.

As illustrated in FIG. 2, the DC inlet 52 has power-line connection units 80p and 80n for DC charging. The power-line connection units 80p and 80n are connected to power lines 82p and 82n (hereinafter also referred to as "DC charging lines 82p and 82n") connecting the DC inlet 52 to the battery 24.

On the power lines 82p and 82n, quick charging contactors 84p and 84n (hereinafter also referred to as "contactors 84p and 84n") are provided on the anode side and the cathode side, respectively. The contactors 84p and 84n which are normally open type contactors are turned on/off in accordance with an instruction from the ECU 42. That is, when charging (DC charging) is performed via the DC inlet 52, the contactors 84p and 84n are turned on. Otherwise, the contactors 84p and 84n are turned off. When a configuration is employed in which power is supplied from the battery 24 via the DC inlet 52 to the outside of the vehicle, the contactors 84p and 84n are turned on even during the power supply.

Various circuit components or sensors which are not illustrated in FIG. 1 may be provided, for example, between the battery 24 and the connector 26 (The same is true for the charging units 14 and 16). For example, just downstream of the battery 24 (on the main power lines 44p and 44n), main contactors (not illustrated) of the anode side and the cathode side may be provided. Alternatively, a bypass circuit for enabling power supply from the battery 24 of the vehicle 12 to the outside (on the charging units 14 and 16 side) may be provided.

Since the transformer 68 is present on the AC charging lines 64a and 64b, the AC charging lines 64a and 64b may be insulated without contractors, such as the contactors 84p and 84n provided for isolation of the DC charging lines 82p and 82n.

(1-2-6. AC-Connection Detection Unit 28 and DC-Connection Detection Unit 30)

The AC-connection detection unit 28 detects connection of a connector 132 (hereinafter also referred to as a "normal charging connector 132") of the normal charging unit 14 or a connector 142 (hereinafter also referred to as a "quick charging connector 142") of the quick charging unit 16 to the AC inlet 50, and outputs the result to the ECU 42. The DC-connection detection unit 30 detects connection of the quick charging connector 142 to the DC inlet 52, and outputs the result to the ECU 42. Therefore, when the normal charging connector 132 is connected to the vehicle-side connector 26, a detection signal is output from the AC-connection detection unit 28. When the quick charging connector 142 is connected to the vehicle-side connector 26, detection signals are output from the AC-connection detection unit 28 and the DC-connection detection unit 30.

(1-2-7. Charging Lid 32, Charging-Lid Open Switch 34, and Lid Lock Mechanism 36)

The charging lid 32 which is a lid (lid body) facing the outside of the vehicle 12 opens/closes by pivoting about a hinge 90 (FIG. 1). The charging lid 32 which is in the closed state covers both of the AC inlet 50 and the DC inlet 52. The charging-lid open switch 34 (hereinafter also referred to as the "switch 34") is a push switch provided near the driver seat (not illustrated), e.g., near the steering (not illustrated). Alternatively, the switch 34 may be provided on a remote controller (not illustrated) for releasing lock of the doors (not illustrated) of the vehicle 12.

A user pushes the switch 34 so as to open the charging lid 32. As described below, the charging lid 32 may be opened by using a method other than that using the switch 34. The lid lock mechanism 36 fixes (locks) the charging lid 32 which is in the closed state.

(1-2-8. DC Inlet Cover 38 and DC Lock Mechanism 40)

The DC inlet cover 38 (hereinafter also referred to as the "cover 38") is a cover which covers the DC inlet 52 of the connector 26 and which is located at a position inner than that of the charging lid 32 in the vehicle 12, and aims, for example, to protect the DC inlet 52 (such as prevention of exposure of live lines). The cover 38 opens/closes by pivoting around a hinge 92, through a user operation (manual operation). Even when the cover 38 is closed, the AC inlet 50 is not covered by the cover 38 (see FIG. 3), and the AC inlet 50 may be connected to the normal charging connector 132.

The DC lock mechanism 40 is used to fix (lock) the DC inlet cover 38 which is closed, and has, for example, an electromagnetic lock.

(1-2-9. ECU 42)

The ECU 42 controls units of the vehicle 12 via vehicle-side communication lines 120, and includes an input/output unit 100, an arithmetic circuit 102, and a storage unit 104. As illustrated in FIG. 1, the arithmetic circuit 102 according to the present embodiment includes a charging lid controller 110, a DC inlet cover controller 112, a contactor welding determination unit 114, and a charging controller 116.

The charging lid controller 110 controls the open/closed states (including the lock state) of the charging lid 32. The DC inlet cover controller 112 controls the open/closed states (including the lock state) of the DC inlet cover 38. The contactor welding determination unit 114 determines whether or not welding of the contactors 84p and 84n occurs. The charging controller 116 controls charging from the charging units 14 and 16 to the battery 24. The charging lid controller 110 and the DC inlet cover controller 112 constitute a lock controller.

(1-2-10. Display Unit 44)

The display unit 44 is provided, for example, for an instrument panel (not illustrated), and displays an error message in accordance with an instruction from the ECU 42.

[1-3. Normal Charging Unit 14]

As illustrated in FIG. 1, the normal charging unit 14 includes an alternating-current power supply 130, the normal charging connector 132 (hereinafter also referred to as the "connector 132"), and a normal charging controller 134 (hereinafter also referred to as a "controller 134"). As the alternating-current power supply 130, for example, power supply for home use or a part of a smart grid may be used. The normal charging unit 14 may be regarded as an apparatus which electrically couples the vehicle 12 to the alternating-current power supply 130, rather than an apparatus including the alternating-current power supply 130.

The normal charging connector 132 is used for coupling to the vehicle-side connector 26 (AC inlet 50). Power lines 136a and 136b from the alternating-current power supply 130 and a communication line 138 from the controller 134 are connected to the connector 132. As described above, even when the DC inlet cover 38 is closed (FIG. 3), the connector 132 may be connected to the AC inlet 50 of the vehicle-side connector 26. The controller 134 controls normal charging from the normal charging unit 14 to the vehicle 12 on the basis of communication or the like with the ECU 42 of the vehicle 12.

[1-4. Quick Charging Unit 16]

As illustrated in FIG. 1, the quick charging unit 16 includes a direct-current power supply 140, the quick charging connector 142 (hereinafter also referred to as the "connector 142"), and a quick charging controller 144 (hereinafter also referred to as a "controller 144"). As the direct-current power supply 140, for example, direct-current power supply for home use (a storage battery, a fuel cell, or the like) or a part of a smart grid may be used. The quick charging unit 16 may be regarded as an apparatus which electrically couples the vehicle 12 to the direct-current power supply 140, rather than an apparatus including the direct-current power supply 140.

The quick charging connector 142 is used for coupling to the vehicle-side connector 26 (the AC inlet 50 and the DC inlet 52). Power lines 146p and 146n from the direct-current power supply 140 and a communication line 148 from the controller 144 are connected to the connector 142. When the DC inlet cover 38 is closed (FIG. 3), it is not possible for the connector 142 to be connected to the vehicle-side connector 26. The controller 144 controls quick charging from the quick charging unit 16 to the vehicle 12 on the basis of communication or the like with the ECU 42 of the vehicle 12.

2. Various Types of Control

Various types of control according to the present embodiment will be described. The ECU 42 according to the present embodiment executes normal control for opening/closing the charging lid, normal control for opening/closing the DC inlet cover, control related to contactor welding, and control related to battery charging. The normal control for opening/closing the charging lid is control related to normal operations of opening/closing the charging lid 32. The normal control for opening/closing the DC inlet cover is control related to normal operations of opening/closing the DC inlet cover 38. The control related to contactor welding is control related to detection of welding of the contactors 84p and 84n. The control related to battery charging is control related to charging of the battery 24.

[2-1. Normal Control for Opening/Closing the Charging Lid]

The normal control for opening/closing the charging lid is executed by the charging lid controller 110 of the ECU 42. In the case where the charging-lid open switch 34 is pressed when the vehicle 12 is stopped, the ECU 42 releases lock of the charging lid 32 so as to cause the charging lid 32 to open. Similarly, in the case where the charging-lid open switch 34 of the remote controller, i.e., a smart key, (not illustrated) is pressed, the ECU 42 may release lock of the charging lid 32 to cause the charging lid 32 to open. When a user closes the charging lid 32 in response to completion or the like of charging of the battery 24, the ECU 42 causes the lid lock mechanism 36 to lock the charging lid 32.

[2-2. Normal Control for Opening/Closing the DC Inlet Cover]

The normal control for opening/closing the DC inlet cover is executed by the DC inlet cover controller 112. In the case where the charging-lid open switch 34 is pressed when the vehicle 12 is stopped, the ECU 42 releases lock of the DC inlet cover 38 in response to release of lock of the charging lid 32. This enables a user to open the DC inlet cover 38 with his/her hand. The same is true for the case in which the charging-lid open switch 34 of the remote controller (smart key) is pressed. When a user closes the DC inlet cover 38 in response to completion or the like of charging of the battery 24, the ECU 42 causes the DC lock mechanism 40 to lock the DC inlet cover 38.

[2-3. Control Related to Contactor Welding]

Figure 4:
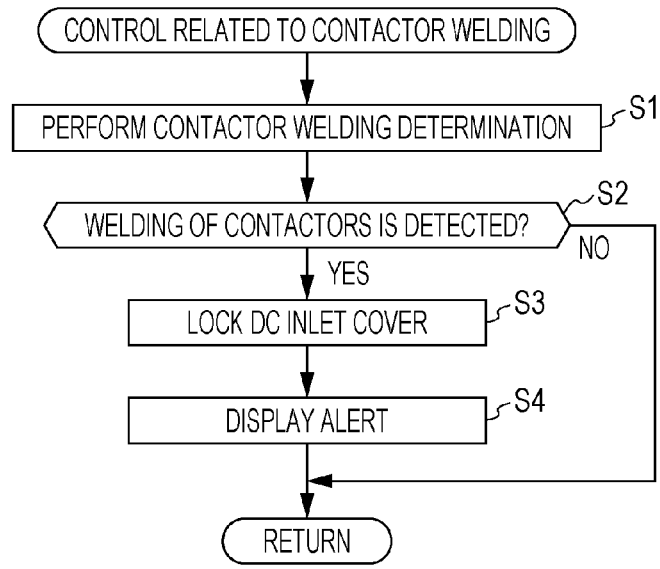
FIG. 4 is a flowchart of control related to contactor welding.

FIG. 4 illustrates a flowchart of the control related to contactor welding. In step S1, the ECU 42 (the contactor welding determination unit 114) performs contactor welding determination to determine (or detect) welding of the contactors 84p and 84n. For the contactor welding determination, for example, a method described in Japanese Unexamined Patent Application Publication No. 2012-228060, the entire contents of which are incorporated herein by reference, may be used. For the contactor welding determination, another method may be used as long as welding of one or both of the contactors 84p and 84n is detected by using the method.

If the result of the contactor welding determination (in step S1) indicates that welding of one of both of the contactors 84p and 84n is not detected (NO in step S2), the process of this execution ends. After a predetermined time elapses, the process starts again from step S1. If welding of one or both of the contactors 84p and 84n is detected (YES in step S2), the process proceeds to step S3. For example, from the viewpoint of prevention of exposure of live lines, it may be determined whether or not welding of both of the contactors 84p and 84n is detected in step S2. In the case of welding of one of the contactors 84p and 84n, it may be determined that welding is not detected.

In step S3, the ECU 42 (the DC inlet cover controller 112) causes the DC lock mechanism 40 to lock the DC inlet cover 38. In the subsequent step, i.e., in step S4, the ECU 42 (the contactor welding determination unit 114), for example, displays an alert on the display unit 44 so as to alert the welding of the contactors 84*p* and 84*n*.

Once welding of the contactors 84*p* and 84*n* is detected, the ECU 42 continues to lock the DC inlet cover 38 and to display the alert until the contactors 84*p* and 84*n* are repaired or checked. For example, the storage unit 104 of the ECU 42 stores a failure code (which indicates welding of the contactors 84*p* and 84*n*). Until an operator removes the failure code by using a dedicated apparatus, the lock of the DC inlet cover 38 and the alert display are continued.

From the viewpoint of a user releasing the lock of the DC inlet cover 38 in case of emergency, the lock of the DC inlet cover 38 may be released through a user operation performed on a predetermined operation unit.

[2-4. Control Related to Battery Charging]

Figure 5:
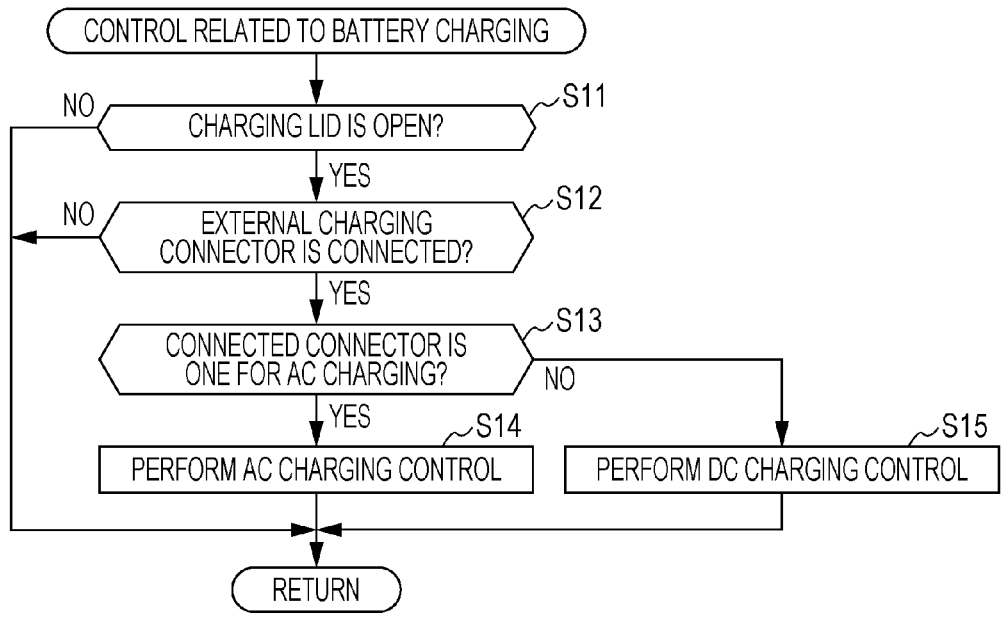
FIG. 5 is a flowchart of control related to battery charging.

FIG. 5 is a flowchart of the control related to battery charging. The process in FIG. 5 is performed by the charging controller 116 of the ECU 42. In step S11, the ECU 42 determines whether or not the charging lid 32 is open. If the charging lid 32 is not open (NO in step S11), the process of this execution ends. After a predetermined time elapses, the process starts again from step S11. If the charging lid 32 is open (YES in step S11), the process proceeds to step S12.

In step S12, the ECU 42 determines whether or not the normal charging connector 132 or the quick charging connector 142 (hereinafter also referred to as the "external charging connector 132 or 142") is connected. If the external charging connector 132 or 142 is not connected (NO in step S12), the process of this execution ends. After a predetermined time elapses, the process starts again from step S11. If the external charging connector 132 or 142 is connected (YES in step S12), the process proceeds to step S13.

In step S13, the ECU 42 determines whether or not the connected external charging connector 132 or 142 is one for AC charging (that is, the normal charging connector 132). The determination may be made, for example, on the basis of detection signals from the AC-connection detection unit 28 and the DC-connection detection unit 30. For example, in the case where a detection signal from the AC-connection detection unit 28 has been received and where a detection signal from the DC-connection detection unit 30 has not been received, it may be determined that the normal charging connector 132 is connected. In contrast, in the case where detection signals have been received from the AC-connection detection unit 28 and the DC-connection detection unit 30, it may be determined that the quick charging connector 142 is connected.

If the connected external charging connector is one for AC charging, i.e., the normal charging connector 132, (YES in step S13), in step S14, the ECU 42 performs normal charging (AC charging) with power (AC) from the normal charging unit 14 (AC charging control). If the connected external charging connector is not one for AC charging, but is one for DC charging, i.e., the quick charging connector 142, (NO in step S13), in step S15, the ECU 42 performs quick charging (DC charging) with power (DC) from the quick charging unit 16 (DC charging control).

From the viewpoint of fail-safe, before performing step S15, the ECU 42 may determine whether or not lock made by the DC lock mechanism 40 has been released. When the DC inlet 52 is connected to the quick charging connector 142 regardless of a state in which the DC lock mechanism 40 has not released the lock, a defect may be present in the DC lock mechanism 40 or the DC-connection detection unit 30. Therefore, if the connected external charging connector is one for DC charging (NO in step S13), in the case where lock made by the DC lock mechanism 40 is not released, the ECU 42 may perform error display on the display unit 44 instead of DC charging control.

3. Effect of the Present Embodiment

As described above, according to the present embodiment, if one or both of the contactors 84*p* and 84*n* between the DC inlet 52 and the battery 24 are welded (YES in step S2 in FIG. 4), the DC inlet cover 38 is locked in the closed state, i.e., a state in which the DC inlet cover 38 covers the DC inlet 52 (in step S3), and use of the DC inlet 52 is limited (see FIG. 3). In contrast, the AC inlet 50 is covered only by the charging lid 32, and is not covered by the DC inlet cover 38 (see FIGS. 1 to 3). Therefore, in a state in which the charging lid 32 is open, AC charging may be performed by connecting the normal charging connector 132 to the AC inlet 50. Therefore, when welding of the contactors 84*p* and 84*n* occurs, charging may be performed via the AC inlet 50 while safety on the DC inlet 52 side is ensured.

In the present embodiment, the electric vehicle 12 includes the lid lock mechanism 36 for locking the charging lid 32 in the closed state, and the charging-lid open switch 34 (lid-lock release instruction input unit) to which a lid lock release instruction to release lock of the charging lid 32 made by the lid lock mechanism 36 is input through a user operation. After welding of the contactors 84*p* and 84*n* is detected, when the lid lock release instruction is input to the charging-lid open switch 34, the charging lid controller 110 (lock controller) of the ECU 42 releases lock of the charging lid 32 made by the lid lock mechanism 36 (normal control for opening/closing the charging lid).

Thus, the DC inlet 52 is covered by the charging lid 32 and the DC inlet cover 38, both of which may be locked, and the AC inlet 50 is covered by the charging lid 32 which may be locked (FIG. 1). Therefore, protection may be ensured for both of the AC inlet 50 and the DC inlet 52, and the double locks may keep the DC inlet 52 in the safety state.

The electric vehicle 12 according to the present embodiment includes the charging controller 116 of the ECU 42 which controls charging of the battery 24 (FIG. 1). After welding of the contactors 84*p* and 84*n* is detected, when the AC inlet 50 is connected to the external charging connector 132 for supplying power from the alternating-current power supply 130, i.e., an external power supply (YES in step S12, and then YES in step S13 in FIG. 5), the charging controller 116 allows charging via the AC inlet 50 (in step S14). Thus, even then welding of the contactors 84*p* and 84*n* occurs, AC charging may be performed, improving user convenience.

In the present embodiment, the transformer 68 in which the primary coil 72 on the AC inlet 50 side faces the secondary coil 74 on the battery 24 side is provided between the AC inlet 50 and the battery 24 (in FIG. 1). Thus, without a cover for the AC inlet 50 which is provided between the AC inlet 50 and the battery 24, exposure of live lines on the AC inlet 50 may be avoided.

4. Modified Embodiment

The present disclosure is not limited to the above-described embodiment. It goes without saying that various configurations may be employed on the basis of the description in the specification. For example, configurations described below may be employed.

[4-1. Electric Vehicle 12 (Application Target)]

In the above-described present embodiment, the electric vehicle 12 is an electric car (battery vehicle) in the narrow sense which has only the motor 20 as a driving source and which has only the battery 24 as a power source (in FIG. 1). However, for example, the electric vehicle 12 is not limited to this from the viewpoint of charging of the battery 24 from the outside of the vehicle. For example, the electric vehicle 12 may be a hybrid vehicle whose driving source is an engine in addition to the motor 20. Instead, the electric vehicle 12 may be a fuel cell vehicle whose power source is a fuel cell in addition to the battery 24. Instead, the electric vehicle 12 may be a vehicle having, as a power source, a generator which generates power by using driving force from an engine, in addition to the battery 24.

In the above-described embodiment, the charging system 10 is applied to the electric vehicle 12. The present disclosure is not limited to this, and the charging system 10 may be applied to other targets. For example, the charging system 10 may be used for a movable unit, such as a ship or an aircraft.

[4-2. Charging-Lid Open Switch 34 (Lid-Lock Release Instruction Input Unit)]

In the above-described embodiment, the charging-lid open switch 34 is used as a unit for opening the charging lid 32, i.e., a unit for releasing lock of the charging lid 32 (in FIG. 1). However, other units may be used to open the charging lid 32. For example, when the vehicle 12 includes a voice recognition device, voice may be input to the voice recognition device inside the vehicle 12 so that the charging lid 32 is opened.

In the above-described embodiment, lock of the charging lid 32 is released in response to an operation on the charging-lid open switch 34 (that is, a user operation). However, for example, from the viewpoint of covering of the DC inlet 52 by using the DC inlet cover 38, lock of the charging lid 32 may be automatically released. For example, in a configuration in which the ECU 42 of the vehicle 12 may communicate with the controllers 134 and 144 of the charging units 14 and 16 in a wireless manner, when the vehicle 12 approaches the charging units 14 and 16 within a predetermined distance and stops, lock of the charging lid 32 may be automatically released.

[4-3. DC Inlet Cover 38]

In the above-described embodiment, the DC inlet cover 38 has a configuration using the hinge 92 (FIGS. 1 to 3). However, for example, from the viewpoint of covering of the DC inlet 52 by using the DC inlet cover 38, the present disclosure is not limited to this. For example, the DC inlet cover 38 may be a sliding cover.

[4-4. Others]

In the above-described embodiment, the transformer 68 for changing AC voltage supplied from the normal charging unit 14 is provided. For example, from the viewpoint of the configuration in which the DC inlet cover 38 is provided, a configuration may be employed in which AC supplied from the normal charging unit 14 is supplied to the rectifier 70 without changing the voltage.

In the above-described embodiment, the motor 20 is present as a load of the battery 24. The present disclosure is not limited to this. Auxiliary machinery, such as an air conditioner, a DC/DC converter, and an accessory, may be provided. The auxiliary machinery may be connected, for example, to the main power lines 44p and 44n or the charging lines 64a, 64b, 82p, and 82n.

An electric vehicle according to the present disclosure has a battery charged with power supplied from an external power supply. The electric vehicle includes a charging lid, a vehicle-side charging connector, a contactor, a contactor welding detection unit, a DC inlet cover, a DC lock mechanism, and a lock controller. The vehicle-side charging connector is disposed at a position inner than that of the charging lid in the electric vehicle. The vehicle-side charging connector is a connector in which both of an AC inlet for AC charging and a DC inlet for DC charging are integrally formed. The contactor is provided on a power line connecting the DC inlet to the battery. The contactor welding detection unit detects welding of the contactor. The DC inlet cover covers the DC inlet and does not cover the AC inlet when the DC inlet cover is in a closed state. The DC lock mechanism locks the DC inlet cover in the closed state. The lock controller causes the DC lock mechanism to lock the DC inlet cover when the welding of the contactor is detected.

According to the present disclosure, when the contactor between the DC inlet and the battery is welded, the DC inlet cover in the closed state (state in which the DC inlet cover covers the DC inlet) is locked so that use of the DC inlet is limited. In contrast, the AC inlet is covered only by the charging lid, not by the DC inlet cover. Therefore, in the state in which the charging lid is open, AC charging may be performed by coupling the AC inlet to the external charging connector for AC charging (connector coupled only to the AC inlet). Therefore, when welding of the contactor occurs, charging may be performed via the AC inlet while safety on the DC inlet side is ensured.

The electric vehicle may further include a lid lock mechanism and a lid-lock release instruction input unit. The lid lock mechanism locks the charging lid in the closed state. The lid-lock release instruction input unit is a unit to which a lid lock release instruction to release the lock of the charging lid is input through a user operation. The lock is made by the lid lock mechanism. After the welding of the contactor is detected, when the lid lock release instruction is input to the lid-lock release instruction input unit, the lock controller may release the lock of the charging lid which is made by the lid lock mechanism.

Thus, the DC inlet is covered by the charging lid and the DC inlet cover, both of which may be locked. The AC inlet is covered by the charging lid which may be locked. Therefore, protection is ensured for both of the DC inlet and the AC inlet. Further, the double locks may keep the DC inlet in the safety state.

The electric vehicle may further include a charging controller that controls charging of the battery. After the welding of the contactor is detected, when an external charging connector for supplying power from the external power supply is connected to the AC inlet, the charging controller may allow charging via the AC inlet. Thus, even when welding of the contactor occurs, AC charging may be performed, improving user convenience.

A transformer in which a primary coil of the AC inlet side faces a secondary coil of the battery side may be provided between the AC inlet and the battery. Thus, without a cover for the AC inlet which is provided between the AC inlet and the battery, exposure of live lines on the AC inlet may be avoided.

According to the present disclosure, an anomaly which occurs in a configuration in which AC charging and DC charging are performed by using one charging connector may be addressed in a preferable manner.

Obviously, numerous modifications and variations of the present invention are possible in light of the above teachings. It is therefore to be understood that within the scope of the appended claims, the invention may be practiced otherwise than as specifically described herein.

What is claimed is:

1. An electric vehicle having a battery charged with power supplied from an external power supply, the electric vehicle comprising:
   a charging lid;
   a vehicle-side charging connector disposed at a position inner than a position of the charging lid in the electric vehicle, the vehicle-side charging connector being a connector in which both of an AC inlet for AC charging and a DC inlet for DC charging are integrally formed;
   a contactor provided on a power line connecting the DC inlet to the battery;
   a contactor welding detection unit that detects welding of the contactor;
   a DC inlet cover that partially covers the vehicle-side charging connector such that the DC inlet cover covers all DC inlets connected to the contactor including the DC inlet and does not cover the AC inlet when the DC inlet cover is in a closed state;
   a DC lock mechanism that locks the DC inlet cover in the closed state; and
   a lock controller that causes the DC lock mechanism to lock the DC inlet cover when the welding of the contactor is detected.

2. The electric vehicle according to claim 1, further comprising:
   a lid lock mechanism that locks the charging lid in the closed state; and
   a lid-lock release instruction input unit to which a lid lock release instruction to release the lock of the charging lid is input through a user operation, the lock being made by the lid lock mechanism,
   wherein, after the welding of the contactor is detected, when the lid lock release instruction is input to the lid-lock release instruction input unit, the lock controller releases the lock of the charging lid, the lock being made by the lid lock mechanism.

3. The electric vehicle according to claim 1, further comprising:
   a charging controller that controls charging of the battery,
   wherein, after the welding of the contactor is detected, when an external charging connector for supplying power from the external power supply is connected to the AC inlet, the charging controller allows charging via the AC inlet.

4. The electric vehicle according to claim 1,
   wherein a transformer in which a primary coil of the AC inlet side faces a secondary coil of the battery side is provided between the AC inlet and the battery.

5. An electric vehicle comprising:
   a battery to be charged with power supplied from an external power supply;
   a charging lid;
   a vehicle-side charging connector disposed inside a position of the charging lid in the electric vehicle and including an AC inlet for AC charging and a DC inlet for DC charging;
   a contactor provided on a power line connecting the DC inlet to the battery;
   a contactor welding detector configured to detect welding of the contactor;
   a DC inlet cover that partially covers the vehicle-side charging connector such that the DC inlet cover covers all DC inlets connected to the contactor including the DC inlet without covering the AC inlet in a state where the DC inlet cover is in a closed state;
   a DC lock mechanism that locks the DC inlet cover in the closed state; and
   a lock controller configured to control the DC lock mechanism to lock the DC inlet cover when the contactor welding detector detects welding of the contactor.

6. The electric vehicle according to claim 5, further comprising:
   a lid lock mechanism that locks the charging lid in the closed state; and
   a lid-lock release instruction input device to which a lid lock release instruction to release a lock of the charging lid is input via a user operation, the lock being made by the lid lock mechanism,
   wherein, after the contactor welding detector detects welding of the contactor, when the lid lock release instruction is input to the lid-lock release instruction input device, the lock controller releases the lock of the charging lid, the lock being made by the lid lock mechanism.

7. The electric vehicle according to claim 5, further comprising:
   a charging controller configured to control charging of the battery,
   wherein, after the contactor welding detector detects welding of the contactor, when an external charging connector for supplying power from the external power supply is connected to the AC inlet, the charging controller allows charging via the AC inlet.

8. The electric vehicle according to claim 5,
   wherein a transformer in which a primary coil of an AC inlet side faces a secondary coil of a battery side is provided between the AC inlet and the battery.

9. The electric vehicle according to claim 5,
   wherein the charging lid covers both of the AC inlet and the DC inlet in the closed state.

10. The electric vehicle according to claim 5,
   wherein once the contactor welding detector detects welding of the contactor, the lock controller continues to lock the DC inlet cover until the contactor is repaired or checked.

* * * * *